Nov. 27, 1934.　　　C. E. CHRYSLER　　　1,982,419
QUEEN BEE EXCLUDER
Filed Aug. 18, 1932　　　3 Sheets-Sheet 1

INVENTOR
Chester E. Chrysler
By Ralph Burch
Attorney

Nov. 27, 1934.                C. E. CHRYSLER                1,982,419
                              QUEEN BEE EXCLUDER
                     Filed Aug. 18, 1932          3 Sheets-Sheet 2

INVENTOR
Chester E. Chrysler
By Ralph Burch
Attorney

Nov. 27, 1934.   C. E. CHRYSLER   1,982,419
QUEEN BEE EXCLUDER
Filed Aug. 18, 1932   3 Sheets-Sheet 3

INVENTOR
Chester E. Chrysler
By Ralph K. Burch
Attorney

Patented Nov. 27, 1934

1,982,419

UNITED STATES PATENT OFFICE 1,982,419

QUEEN BEE EXCLUDER

Chester Ernest Chrysler, Chatham, Ontario, Canada

Application August 18, 1932, Serial No. 629,361
In Canada August 19, 1931

1 Claim. (Cl. 6—4)

This invention relates to improvements in a queen bee excluder, its primary object being to prevent the queen bee from passing from the brood chamber to the upper sections of the hive.

Further object is to provide an excluder that will preserve the correct bee space between the super and the hive and prevent any sag in the central portions of the device.

A still further object is to provide such an excluder that may be readily cleansed from wax or other substance.

Figure 1:
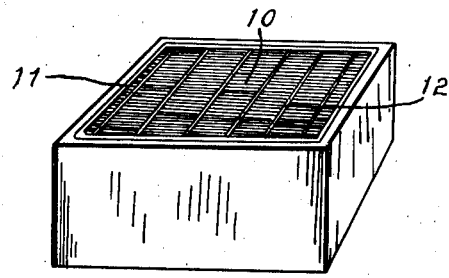
Fig. 1 is a perspective view of the excluder in position on a hive.
Figure 2:
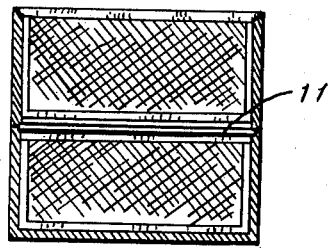
Fig. 2 is a cross-sectional elevation showing the location of the excluder between the super and the hive.
Figure 3:
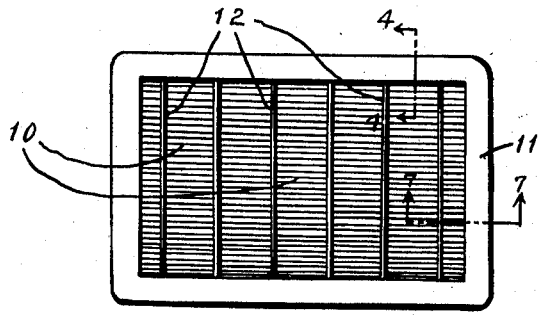
Fig. 3 is a plan view of the excluder.

Referring more in detail to the drawings in which similar reference characters designate corresponding parts throughout the several views it will be seen that the invention comprises a plurality of wires 10 of suitable length and gauge arranged at equal distance from and parallel to each other. The said wires terminating in the ends of a folded metal framework 11 or 11a. A plurality of metal transverse supporting members 12 likewise have their ends in termination within the fold of the framework 11. In order to preserve the correct bee space between super and hive the wires 10 must be kept from sagging in the centre, also the transverse supporting members must be slightly below the upper plane of the framework 11 or 11a. This is provided for in each of the alternative end and side construction which will now be explained in detail.

Figure 4:
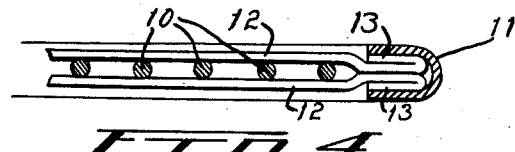
Fig. 4 is a detailed cross-sectional view taken on the line 4—4 of Fig. 3.
Figure 8:
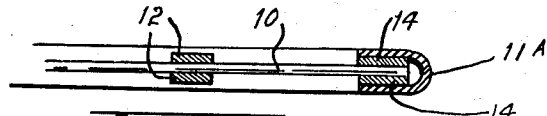
Fig. 8 is a similar cross-section showing an alternate construction.
Figure 9:
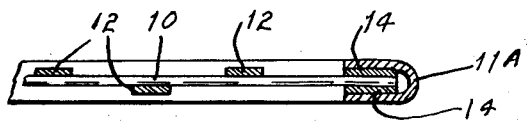
Fig. 9 is a similar cross-section showing a still further modification.

Fig. 4 shows the wires 10 supported by an upper and lower support to which they are secured in a suitable manner. The ends of the supporting members are folded back on themselves as shown at 13 in order to build up the correct thickness for the framework 11 or 11a. In Fig. 8 is shown a corresponding cross sectional view at right angles to Fig. 4. This shows the wires terminating in the framework 11a, two metal strips 14 one above and one below being provided to build up to the required size of the framework. In Fig. 9 the same construction is used with the exception that the upper and lower supports 12 are not together but are spaced alternately above and below the wires 10.

Figure 5:
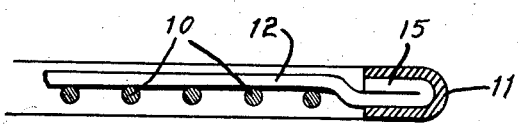
Fig. 5 is a similar cross-section showing an alternate construction.
Figure 7:
Fig. 7 is a detailed cross-sectional view taken on the line 7—7 of Fig. 3.

In Fig. 5 the transverse member 12 is single and is placed above the wires to which it is secured. Its end is also folded as shown at 15 and the framework 11 fitted over the same. Fig. 7 is the corresponding cross sectional view at right angles to Fig. 5 and shows a strip 16 across the ends of the wires to build up the thickness and keep the wire and supports centrally in the framework.

Figure 6:
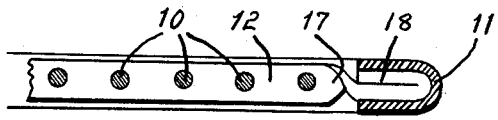
Fig. 6 is a similar cross-section showing a still further modification.

In Fig. 6 the transverse member is on edge, the wires 10 passing through holes drilled in the same. The end is first twisted as shown at 17 then folded as at 18. The wires 10 being in the centre with this design the corresponding end section will be somewhat similar to Fig. 8.

Figure 10:
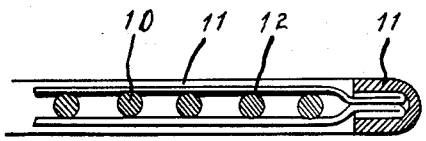
Fig. 10 is a cross-section taken on the same plane as the section of Fig. 4 showing a further alternate construction eliminating the use of fill-ins 14 at ends of cross members.

Figure 10 is constructed to eliminate fillers 14 and 16, in receiving wires 10 by adopting a thicker metal in frame and thinner cross bars 12.

Figure 11:
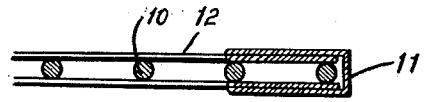
Fig. 11 is a cross-section taken on the same plane as the section of Fig. 4 showing a further alternate construction.

Figure 11 is a further construction. The wires 10 and cross bars 12 are arranged the same as in Figs. 7, 8 and 9 except that one or more of the wires are placed inside of side piece of frame 11.

Figure 12:
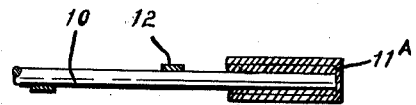
Fig. 12 is a cross-section taken on the same plane as the section of Fig. 7 showing a further alternate construction.

Figure 12 is the construction of Figure 11 at end of frame 11.

Figure 13:
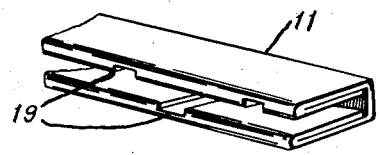
Fig. 13 is a perspective view of side portion of the frame.

Figure 13 shows the construction of side of frame 11 showing recesses 19; these recesses 19 can be placed opposite, alternate or on one side only.

Figure 14:
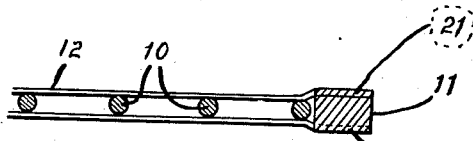
Fig. 14 is a cross-section taken on the same plane as the section of Fig. 4 showing a further alternate construction.
Figure 15:
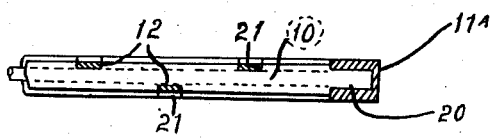
Fig. 15 is a cross-section taken on the same plane as the section of Fig. 7 showing a further alternate construction.

Figure 14 is still another construction similar, except that side member of frame 11 is a flat bar of suitable thickness reduced in thickness at each end as at 20 to receive end cross pieces 11a of said frame, side pieces of frame 11 having recesses 21 placed at required distance spaced either opposite, alternate or on one side to receive the ends of cross bars 12.

I claim:—

In a queen bee excluder as described, a plurality of wires equally spaced from and parallel with each other, a rectangular metal framework folded over the ends of same, a plurality of transverse supports alternately above and below the said wires and secured thereto having their ends fastened within the metal framework and maintaining the same at the required thickness substantially as set forth.

CHESTER ERNEST CHRYSLER.